(12) United States Patent
Belpaire et al.

(10) Patent No.: US 9,611,638 B2
(45) Date of Patent: Apr. 4, 2017

(54) INSULATION ELEMENT, EXPANDED INSULATION ELEMENT, USE OF SAME AND METHOD FOR INSULATION

(71) Applicant: SIKA TECHNOLOGY AG, Baar (CH)

(72) Inventors: Vincent Belpaire, Uccle (BE); Guillaume Lecroart, Silly (BE); Nicolas Brichet, Zürich (CH); Lionel Gilot, Jemeppe-sur Sambre (BE)

(73) Assignee: SIKA TECHNOLOGY AG, Barar (CH)

( * ) Notice: Subject to any disclaimer, the term of this patent is extended or adjusted under 35 U.S.C. 154(b) by 0 days.

(21) Appl. No.: 14/654,150

(22) PCT Filed: Dec. 13, 2013

(86) PCT No.: PCT/EP2013/076522
§ 371 (c)(1),
(2) Date: Jun. 19, 2015

(87) PCT Pub. No.: WO2014/095620
PCT Pub. Date: Jun. 26, 2014

(65) Prior Publication Data
US 2015/0315782 A1    Nov. 5, 2015

(30) Foreign Application Priority Data
Dec. 21, 2012 (EP) ................................. 12198960

(51) Int. Cl.
*B62D 29/04* (2006.01)
*F16J 15/14* (2006.01)
(Continued)

(52) U.S. Cl.
CPC ............ *E04B 1/84* (2013.01); *B29C 44/1214* (2013.01); *B29C 44/1271* (2013.01);
(Continued)

(58) Field of Classification Search
CPC ........ B62D 29/00; B62D 29/002; F16J 15/14; B65D 53/06
(Continued)

(56) References Cited

U.S. PATENT DOCUMENTS 5,506,025 A * 4/1996 Otto .................. B29C 44/188
428/124
5,755,486 A * 5/1998 Wycech ................ B29C 70/66
296/187.02
(Continued)

FOREIGN PATENT DOCUMENTS

CH    EP 2883781 A1 *  6/2015    ............... C08J 9/04
EP      1134126 A2      9/2001
(Continued)

OTHER PUBLICATIONS

International Search Report (in German with English Translation) for PCT/EP2013/076522, mailed May 19, 2014; ISA/EP.

*Primary Examiner* — Edgardo San Martin
(74) *Attorney, Agent, or Firm* — Buchanan Ingersoll & Rooney PC

(57) ABSTRACT

The invention relates to an insulation element, in particular for the acoustic insulation of an opening and/or of a cavity in a vehicle or building, having a carrier element and an expendable material. The carrier element has a plurality of through-holes, wherein only one surface of the carrier element is covered at least partially with expandable material, and the expandable material at least partially fills the through-holes. The invention relates furthermore to an insulation element produced therefrom, the use of the same and a method for the acoustic insulation and/or reinforcement of an opening or a cavity in a land, air or water vehicle or in a building.

17 Claims, 4 Drawing Sheets

(51) Int. Cl.
| | |
|---|---|
| *E04B 1/84* | (2006.01) |
| *B32B 37/18* | (2006.01) |
| *B32B 37/14* | (2006.01) |
| *B32B 38/00* | (2006.01) |
| *B60R 13/08* | (2006.01) |
| *G10K 11/16* | (2006.01) |
| *B29C 44/12* | (2006.01) |
| *B29C 44/18* | (2006.01) |
| B62D 29/00 | (2006.01) |
| F16J 15/00 | (2006.01) |
| B29K 711/14 | (2006.01) |
| B29L 31/30 | (2006.01) |
| B29L 31/00 | (2006.01) |
| B29K 23/00 | (2006.01) |
| B29K 63/00 | (2006.01) |
| B29K 675/00 | (2006.01) |
| B29K 677/00 | (2006.01) |
| B29L 31/10 | (2006.01) |

(52) U.S. Cl.
CPC .......... *B29C 44/188* (2013.01); *B32B 37/142* (2013.01); *B32B 37/18* (2013.01); *B32B 38/0036* (2013.01); *B60R 13/08* (2013.01); *G10K 11/16* (2013.01); *B29K 2023/083* (2013.01); *B29K 2063/00* (2013.01); *B29K 2675/00* (2013.01); *B29K 2677/00* (2013.01); *B29K 2681/06* (2013.01); *B29K 2711/14* (2013.01); *B29K 2995/0002* (2013.01); *B29L 2031/001* (2013.01); *B29L 2031/10* (2013.01); *B29L 2031/3002* (2013.01); *B32B 2307/102* (2013.01); *B32B 2605/00* (2013.01)

(58) Field of Classification Search
USPC .................. 181/294, 207, 295; 296/187.02
See application file for complete search history.

(56) References Cited

U.S. PATENT DOCUMENTS

| | | | | |
|---|---|---|---|---|
| 5,806,915 | A * | 9/1998 | Takabatake | B29C 44/188 296/187.02 |
| 5,904,024 | A * | 5/1999 | Miwa | G10K 11/16 52/309.1 |
| 6,093,358 | A * | 7/2000 | Schiewe | B29C 44/1214 264/250 |
| 6,103,341 | A * | 8/2000 | Barz | B29C 44/18 277/605 |
| 6,347,799 | B1 * | 2/2002 | Williams | B62D 29/002 277/316 |
| 6,382,635 | B1 * | 5/2002 | Fitzgerald | B29C 44/1214 277/630 |
| 6,413,611 | B1 * | 7/2002 | Roberts | B62D 29/002 296/193.06 |
| 6,988,585 | B2 * | 1/2006 | Mourieras | B62D 29/002 181/204 |
| 7,597,382 | B2 * | 10/2009 | Vilcek | B29C 44/18 296/187.02 |
| 7,823,693 | B2 * | 11/2010 | Boyce | B60R 13/0815 181/284 |
| 8,087,916 | B2 * | 1/2012 | Kanie | B29C 44/18 249/63 |
| 8,668,046 | B2 * | 3/2014 | Lecroart | B62D 29/002 181/264 |
| 8,967,327 | B2 * | 3/2015 | Synnestvedt | B65D 90/52 181/284 |
| 9,216,774 | B2 * | 12/2015 | Belpaire | B62D 29/002 |
| 2006/0057333 | A1 * | 3/2006 | Brahim | B29C 44/1214 428/138 |
| 2013/0037152 | A1 * | 2/2013 | Belpaire | B29C 44/188 138/37 |

FOREIGN PATENT DOCUMENTS

| | | |
|---|---|---|
| EP | 1362683 A2 | 11/2003 |
| EP | 2147848 A1 | 1/2010 |
| WO | WO-2010060241 A1 | 6/2010 |
| WO | WO-2011146793 A1 | 11/2011 |

\* cited by examiner

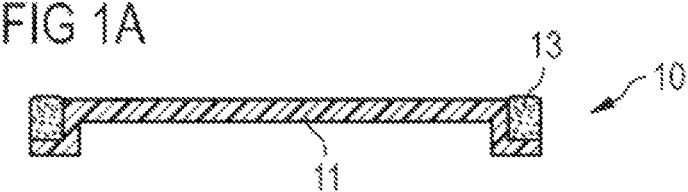
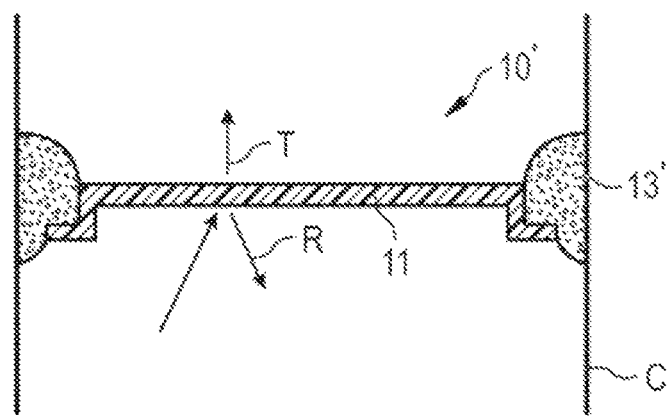
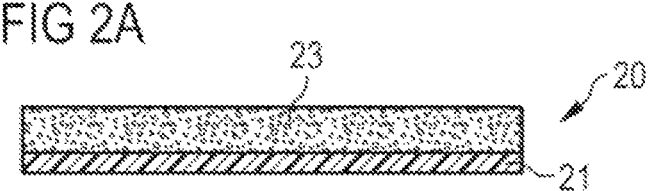
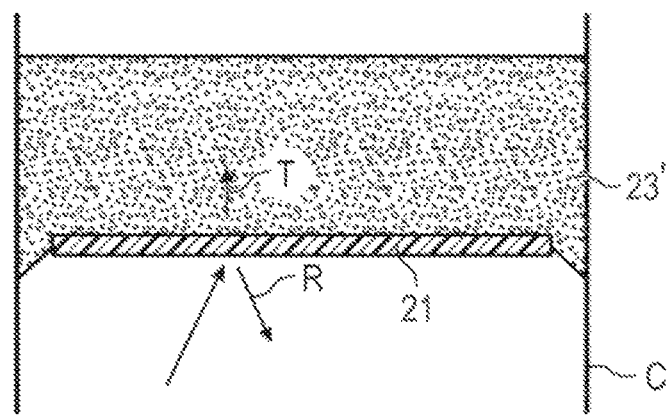

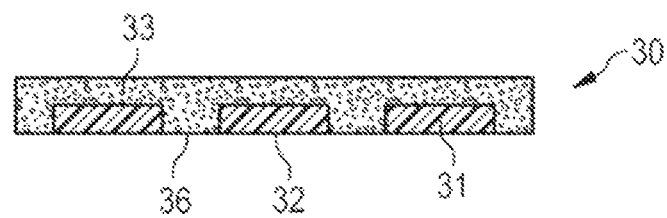
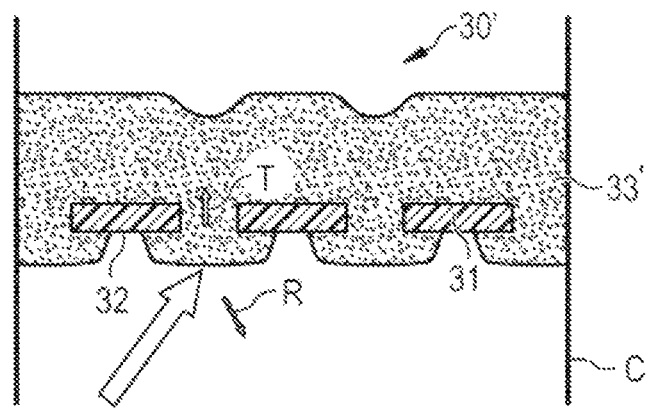
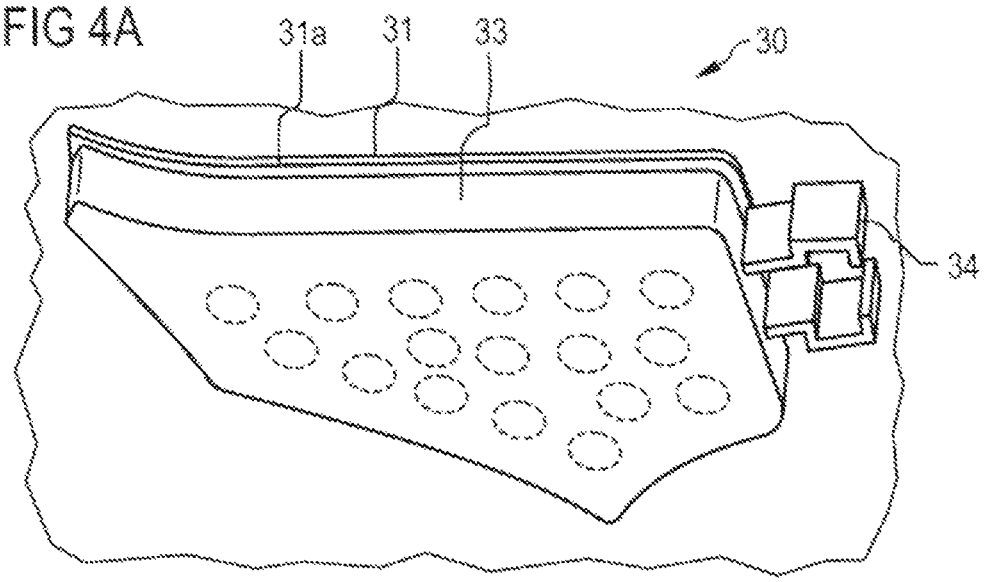

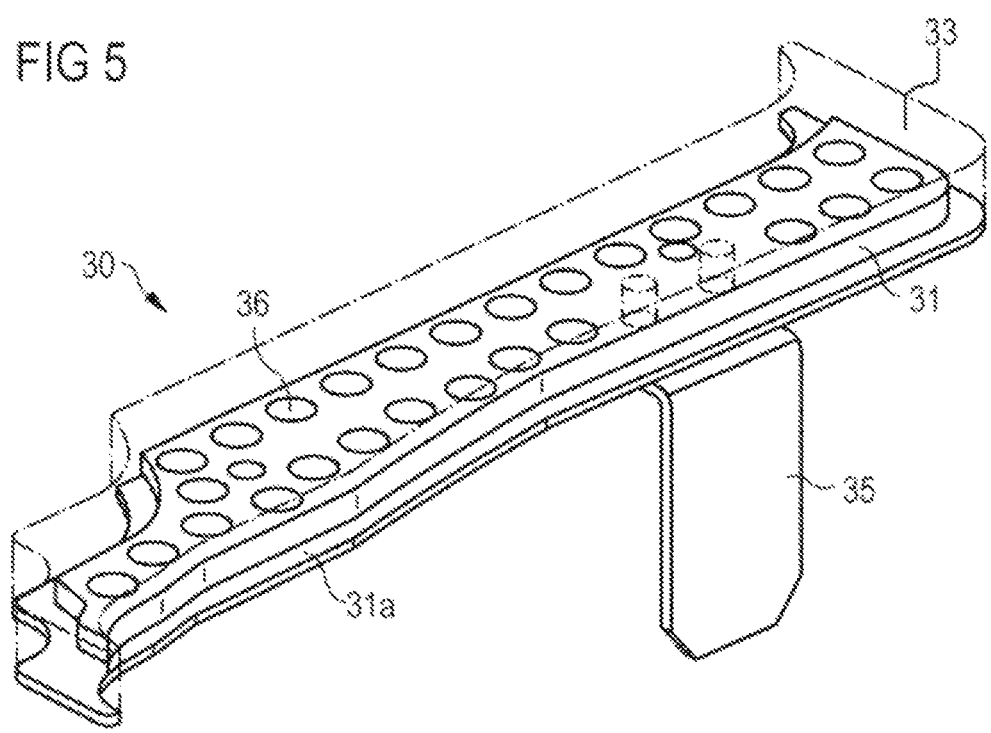

INSULATION ELEMENT, EXPANDED INSULATION ELEMENT, USE OF SAME AND METHOD FOR INSULATION

CROSS REFERENCE TO RELATED APPLICATIONS

This application is a U.S. National Phase Application under 35 U.S.C. 371 of International Application No. PCT/EP2013/076522 filed on Dec. 13, 2013 and published in German as WO 2014/095620 A1 on Jun. 26, 2014. This application is based on and claims the benefit of priority from European Application No. 12198960.2 filed on Dec. 21, 2012. The entire disclosures of all of the above applications are incorporated herein by reference.

TECHNICAL FIELD

The invention relates to an insulation element, in particular for the acoustic insulation of a through-hole and/or of a cavity in a vehicle or building, with a carrier element and an expandable material. It relates furthermore to an expanded insulation element, to the use of same as well as to a method for insulation.

PRIOR ART

Construction elements, such as car bodies and/or frames of transport and conveyance means, water, land, or air vehicles, commonly have cavities in particular in order to make it possible to produce, in particular, light-weight constructions. However, these cavities cause a great number of problems. Depending on the type of the cavity, it has to be waterproofed in order to prevent the penetration of moisture and contaminants that can lead to the corrosion of the construction elements. It is often desirable to substantially reinforce the cavities and thus the construction element while keeping the weight low. It is often also necessary to stabilize the cavity and thus the construction elements in order to reduce noise which would otherwise be transmitted along or through the cavity. Many such cavities have an irregular shape or a narrow extent, which makes it difficult to waterproof, reinforce and insulate them correctly.

Therefore, in particular in car manufacturing, but also in aircraft and ship manufacturing, waterproofing elements (English: baffle) are used in order to waterproof and/or to acoustically seal the cavities, or reinforcement elements (English: reinforcer) are used in order to reinforce the cavities. In construction, for insulation purposes, expandable materials or materials that expand in the process of being introduced or applied are used for numerous purposes, in particular for waterproofing and for acoustic insulation of openings or cavities in the sector of house installation or building cladding.

FIGS. 1A and 1B as well as 2A and 2B diagrammatically show two known concepts for the waterproofing and insulating closure of openings or cavities in a motor vehicle.

FIG. 1A shows an insulation element 10 in cross section, which comprises a carrier element 11 and an expandable material 13 in its beveled marginal area. FIG. 1B shows an expanded insulation element 10' formed from this insulation element and inserted in a cavity C. By expanding the expandable material to an expanded material 13', waterproofing and insulation areas are formed on the margin of the carrier element 11, which at the same time achieve an immobilization of the insulation element 10' in the cavity C.

FIGS. 2A and 2B show, in a similar representation mode, an insulation element 20 with a (here completely flat) carrier element 21 and an expandable material 23 covering one of the two surfaces of the carrier element 21, and an insulation element 20' formed therefrom, inserted again in a cavity C. Here the marginal areas and the entire surface of the carrier element 21 are covered with the expanded material (foam) 23' formed from the expandable material, so that an insulation effect is achieved over the entire cross section of the cavity. In FIGS. 1B and 2B, the reflection and transmission of sound waves is denoted diagrammatically by means of the arrows marked R and T.

From WO 2010/060381, an insulation element is known, which has a substantially flat shape and which, by means of a regular arrangement of through-holes, is coated on both sides with an expandable material. After expanding of this material, the two surfaces of this insulation element (except for the central area of the openings) are completely covered with the insulating material. However, its manufacture is comparatively complex and expensive and the insulation is not ideal.

From EP 1 362 683, an insulation element is known, in which a material that is expandable in the initial state and expanded in the final state is arranged between two mutually parallel and spaced apart carrier plates with a cellular structure. An insulation element produced from this insulation element by expanding the expandable material is characterized in that the outer surfaces of the support structure are completely covered with the expandable material (foam), which has penetrated through the openings of the cellular structure.

The publication EP 2 147 848 A1 describes a reinforcement element that is to be used for sound insulation among other purposes. Optionally, the reinforcement element of EP 2 147 848 A1 can comprise a carrier with a perforation. In an embodiment of DE 2 147 848 A1, an "acoustic foam" is proposed. In this embodiment (in the "baked state"), a surface of a carrier is covered with the foam, wherein an opposite surface remains free.

WO 2011/146793 A1 describes a so-called "activatable material," which is to be used, for example, for acoustic noise reduction and which is to be arranged in one or more perforations. In an embodiment of WO 2011/146793 A1, the "activatable material", before activation, is pressed through a perforation, so that the "activatable material" is arranged on the two sides of a carrier before the activation. Overall, this prior art is considered to be comparatively expensive.

DESCRIPTION OF THE INVENTION

The invention is based on the problem of providing an improved insulation element or expanded insulation element of the above-explained type. Moreover, an improved method for acoustic insulation of a through-hole and/or of a cavity should be provided.

This problem is solved in its device aspect by an insulation element having the features of Claim 1, and in its process aspect by a method having the features of the process claim. Advantageous developments of the idea of the invention are the subject matter of the dependent claims.

In particular, the problem is solved by an (expandable) insulation element, preferably for the acoustic insulation of an opening and/or of a cavity in a vehicle or building, with a carrier element and an expandable material, wherein the carrier element comprises a plurality of through-holes, wherein (in the non-expanded state) only one surface of the carrier element is covered at least partially with expandable material, and the expandable material at least partially fills the through-holes. Preferably, the expandable material is expanded in the expanded state onto peripheral areas in the surface of the carrier element opposite from the surface of the carrier element which is covered at least partially (in the non-expanded state) with expandable material.

A core idea of the present invention therefore is that, before the expansion, the expandable material covers only one (or just one; English: one) surface of the carrier element, but is introduced (at least partially) into the through-holes. After the expansion, the expandable material also covers sections of the other surface on which the expandable material was not arranged before the expansion. In particular, the initial arrangement of the expandable material is as a result comparatively simple. A reliable immobilization of the expandable material is achieved in a synergistic manner in that said material is expanded. At the same time, an insulation element with a high degree of sound absorption is produced. "Surface" of the carrier element which (in the unexpanded state) is already covered with the expandable material should be understood to mean a surface of the carrier element which extends to a marginal area of the carrier element. The surface of the carrier element which (only in the expanded state) is covered with expandable material is here located opposite from the surface of the carrier element which, in the non-expanded state, is covered with expandable material (and also extends to a marginal area).

In an advantageous design of the proposed (expandable) insulation element, the expandable material (in the non-expanded state) extends into the through-holes, in particular (substantially) up to the free surface of the flat section (and not beyond). This allows the formation of an insulation element in which the expandable material is expanded to form a closed coating of just one surface of the flat section of the carrier element as well as onto peripheral areas of the surface opposite from the closed coating.

The coating of the carrier element with the expandable material in the preproduct step (in the non-expanded state) is designed especially so that, in the final product (in the expanded state), more than 50%, in particular up to 75% of the free surface, opposite from the closed coating, of the flat section of the carrier element is covered with the expanded material. 50% to 95%, preferably 50% to 90%, and particularly preferably 60 to 75% of the free surface is covered.

In principle, the peripheral areas, covered with expanded material, of the surface not originally covered with expandable material can be connected to one another by material bridges or transition partially into one another. It is essential that, on this surface, a pronounced recess structure exists, which has a plurality of several bulges which considerably decrease the reflection of sound waves that strike there, due to cancellation effects.

The insulation element has an excellent performance/weight and performance/cost ratio relative to its acoustic insulation properties.

In a further design of the invention, the carrier element is made of a plastic, in particular of a polyurethane, polyamide, poly(phenylene ether), polysulfone or polyether sulfone. Alternatively, the carrier element can consist of a natural material, in particular a wood or another fiber material.

The carrier element is preferably plate shaped (that is to say it forms a carrier plate). In this embodiment, a first side of the plate forms the surface that is covered already in the non-expanded state of the material, and another side (opposite, facing in the opposite direction) forms the surface that is covered (only) in the expanded state of the expandable material. The plate margin or plate edge is located between the two sides.

In a preferred design, an expanded insulation element is proposed, wherein the expandable material is expanded onto the peripheral areas of the surface of the carrier element opposite from the surface of the carrier element which is covered at least partially with expandable material.

According to a variant, an (expandable or expanded) insulation element is proposed, wherein (in the expanded state) a surface of the carrier element is covered with a closed layer, and the other opposite surface thereof is covered with expanded material at least partially in areas close to the periphery of the through-holes.

According to a preferred embodiment, an (expanded or expandable) insulation element is proposed, wherein (in the expanded state) 50% to 95%, preferably 50 to 90%, and particularly preferably 60 to 75% of the free surface is covered with expanded material.

Preferably (in the expanded state), recesses are formed on the completely covered surface of the carrier element above the through-holes.

In additional designs of the invention, it is provided that the expandable material comprises a chemical propellant, for example, azodicarbonamide, sulfohydrazide, hydrogen carbonate or the like, or a physical propellant. In embodiments that are easy to produce using commercially available starting substances, it is provided that the expandable material has a single-component epoxy resin or polyurethane or EVA composition.

Proposed, moreover, is the use of the above-specified insulation element according to the invention for acoustic insulation and/or reinforcement of an opening and/or of a hollow space of a land, air or water vehicle, in particular of an outer shell of same or for the acoustic and/or thermal insulation of areas, in particular of an opening and/or of a cavity, of a building.

According to a further aspect of the present invention, a method is proposed for acoustic insulation and/or reinforcement of an opening or of the cavity, wherein an insulation element of the above-described type is introduced into the opening or the cavity, and subsequently the expandable material is expanded.

BRIEF DESCRIPTION OF THE DRAWING

Advantages and uses of the invention result moreover from the following description of embodiment examples and aspects, partially in reference to the figures. From these, show:

FIGS. 1A and 1B show diagrammatic representations for the explanation of a first acoustic insulation concept, FIGS. 2A and 2B show diagrammatic representations for the explanation of a second acoustic insulation concept, FIGS. 3A and 3B show a diagrammatic representation of an embodiment of the insulation element and expanded insulation element (3B) according to the invention, FIGS. 4A, 4B show a perspective representation of an additional embodiment of the insulation element according to the invention, FIG. 5 shows perspective representations for the explanation of an additional embodiment example of the invention.

Only the elements essential for the direct understanding of the invention are shown. Similar elements or elements having an equivalent effect are provided with identical reference numerals.

WAY OF CARRYING OUT THE INVENTION

Figure 4B:
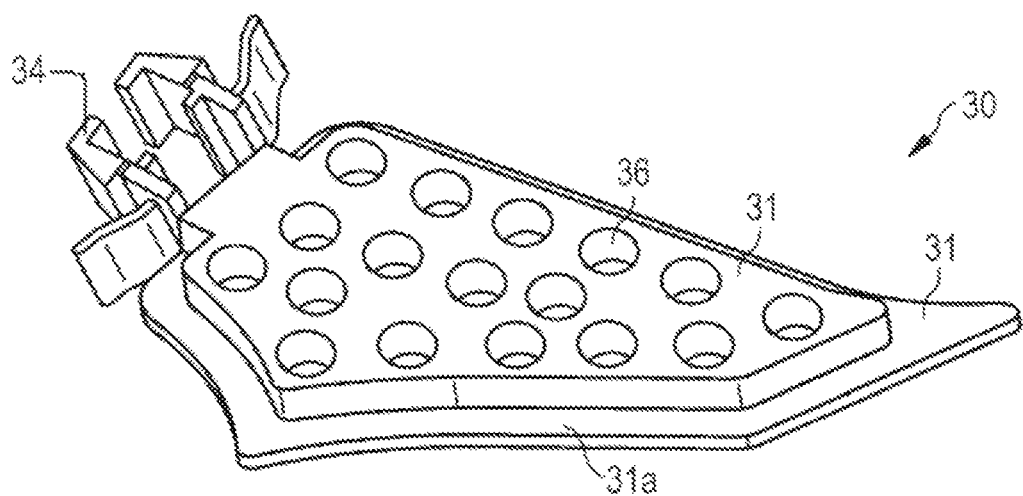

FIGS. 3A and 3B show, in cross section, an insulation element 30 according to the invention (FIG. 3A) and an expanded insulation element 30' (FIG. 3B), the latter being inserted in a cavity C to be acoustically insulated, for example, in a structural element of a vehicle. The insulation element 30 comprises a plate-like plastic carrier element 31 with a plurality of through-holes, perforation holes 36, and an expandable material 33 arranged on the surface of the carrier element, which penetrates particularly preferably also through the through-holes 36 to the lower surface 32 of the carrier element here, which is free in the initial state. Here, the expandable material 33 does not have to pass through the through-holes to the free surface 32; it can instead also project slightly beyond the free surface 32. However, it is particularly preferable that the expandable material 33 passes through the through-holes 36 to the surface. The areal fraction of the through-holes 36 is preferably approximately 20 to 70%, particularly preferably approximately 30 to 60%, more preferably approximately 30 to 50%, in particular 30 to 40% of the total area of the carrier element. The through-holes preferably have a round or elliptic shape but they can also have a polygonal shape or any other shape.

FIG. 3B shows the insulation element 30' foamed into the cavity C and illustrates that the expanded expandable material 33' covers one surface of the carrier element 31 with a closed layer and the other free surface 32 thereof partially, in particular, in each case in areas close to the periphery of the through-holes 36. 50% to 95%, preferably 50% to 90% and particularly preferably 60 to 75% of the free surface 32 is covered. Due to the expansion of the expandable material through the through-holes 36, small recesses have formed in each case on the completely covered surface of the carrier element 31 above the through-holes, so that the two surfaces of the insulation element have a recess structure.

Due to this recess structure and the absence of flat surfaces, there is both a reduced reflection capacity and also a reduced transmission capacity for sound waves, which is illustrated by the arrows drawn in FIG. 3B and marked with R (for reflection) and T (for transmission).

FIG. 4A shows a special geometric configuration of an insulation element constructed according to FIG. 3A, in a perspective view; FIG. 4B shows a carrier element having a similar constitution to the insulation element shown in FIG. 4A. The carrier element has an attachment element 34, for example, a clip, by means of which the insulation element can be attached in a cavity. In addition, the carrier element 31 has a marginal area 31a. The latter substantially encloses the carrier element and it is of thinner design in cross section in comparison to the area of the carrier element that is provided with through-holes 36, FIGS. 4B and 5.

Figure 4C:
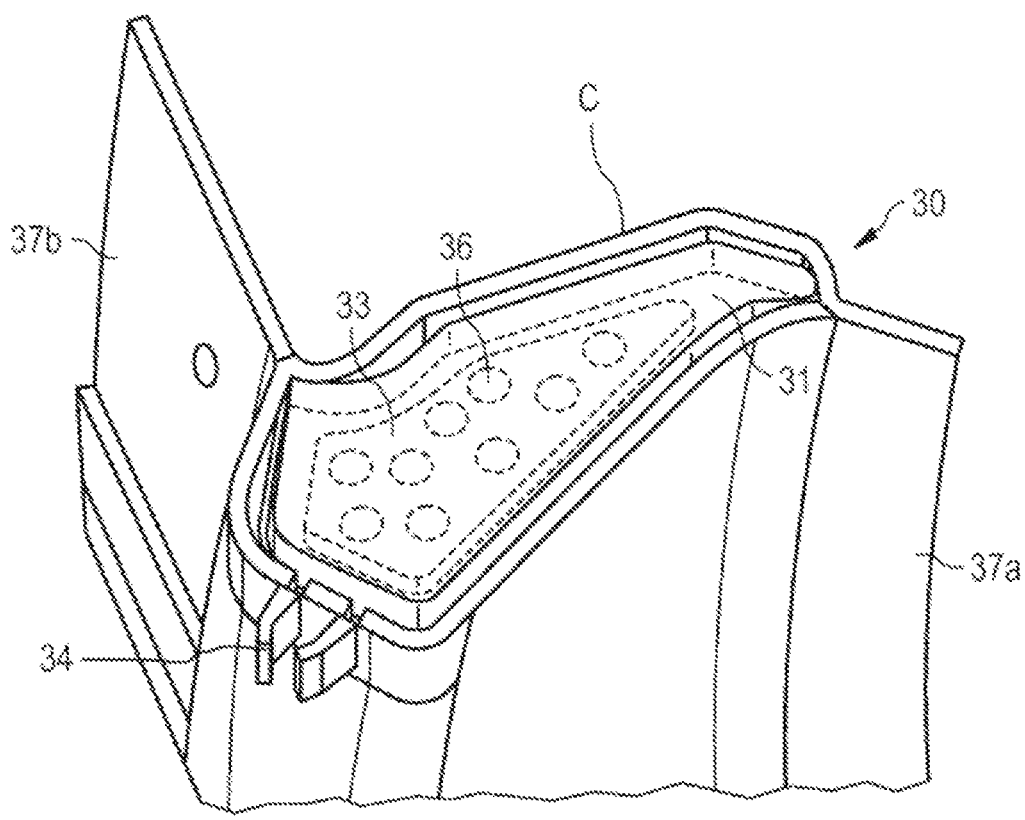
FIG. 4C shows a perspective representation of the insulation element according to 4A and 4B in an installation situation.

FIG. 4C shows an insulation element 30 of similar constitution to that of FIG. 4A, which comprises a carrier element 31 provided with through-holes 36 and a layer 33 of a foamable material applied thereon, in an installation situation in a cavity C delimited by delimitation elements 37a, 37b, respectively metal sheets, of, for example, a motor vehicle structure. By foaming the foamable material 33, an insulation element is formed, which is firmly foamed into the cavity and which largely insulates said space acoustically and optionally also thermally and protects it from the entry of moisture.

FIG. 5 shows, as an additional embodiment, an insulation element 30 with a carrier element 31 made of polyamide, for example, which has a plurality of circular through-holes 36 and an expandable material 33 applied thereon. The thickness of the carrier material just like that of the applied expandable material can be approximately 4 mm. The insulation element 30 is provided here with an attachment element 35 which is formed here as a metal element made of sheet metal, for example, and which can be connected to the cavity structure by welding, for example.

The plurality of circular through-holes, holes 36, in the carrier element, which is made in this example of 4.5 mm thick PA 6.6, and the proportion of the through-holes amounts to approximately 30 to 40% of the total area of the carrier. As foamable material, for example, elastically foaming polyurethane having a layer thickness of 4 mm is applied, which, after the foaming of the expandable material, can preferably have a thickness between 30 and 40 mm.

It should be understood that the concept according to the invention can be implemented in diverse other configurations including with multi-part carrier elements having spatially complex shapes.

Expandable (Foamable) Materials

In principle, any material that can be caused to foam in a controlled manner can be used as foamable material. This material may or may not have reinforcing properties here. Typically, the foamable material is foamed thermally, by moisture, or by electromagnetic radiation.

Typically, such a foamable material comprises a chemical or physical propellant. Chemical propellants are organic or inorganic compounds that decompose under the influence of temperature, moisture, or electromagnetic radiation, wherein at least one of the decomposition products is a gas. As physical propellant, one can use, for example, compounds that transition into a gaseous state of matter when the temperature is increased. As a result, both chemical and also physical propellants are capable of generating foam structures in polymers.

The foamable material is preferably thermally foamed, wherein chemical propellants are used. Suitable chemical propellants are azodicarbonamides, sulfohydrazides, hydrogen carbonates or carbonates, for example.

Suitable propellants are also commercially available, for example, under the trade name Expancel® from the company Akzo Nobel, Netherlands, or under the trade name Celogen® from the company Chemtura Corp., USA. The heat required for the foaming can be introduced by external or by internal heat sources such as an exothermic chemical reaction. The foamable material is preferably foamable at a temperature of ≤160° C., in particular from 80° C. to 150° C., preferably from 90° C. to 140° C.

Suitable foamable materials are, for example, single-component epoxy resin systems that are not fluid at room temperature and have, in particular, an elevated impact resistance, and contain thixotropic agents such as aerosils or nanoclays. For example, such epoxy resin systems comprise 20 to 50% by weight of a fluid epoxy resin, 0 to 30% by weight of a solid epoxy resin, 5 to 30% by weight of toughness modifiers, 1 to 5% by weight of physical or chemical propellants, 10 to 40% by weight of fillers, 1 to 10% by weight of thixotropic agents and 2 to 10% by weight of heat-activatable curing agents. Suitable toughness modifiers are reactive fluid rubbers based on nitrile rubber or derivatives of polyether polyolpolyurethanes, core shell polymers and similar systems known to the person skilled in the art.

Additional suitable foamable materials are single-component polyurethane compositions that contain propellants and are formed from crystalline, OH group-comprising polyesters mixed with additional polyols, preferably polyether polyols, and polyisocyanates with blocked isocyanate groups. The melting point of the crystalline polyester should be ≥50° C. The isocyanate groups of the polyisocyanate can be blocked, for example, with nucleophils such as caprolactam, phenols or benzoxalones. Moreover, blocked polyisocyanates as used in the powdered paint technology, for example, are also suitable for use and commercially available, for example, under the trade names Vestagon®BF 1350 and Vestagon® BF 1540 from Degussa GmbH, Germany. Also as isocyanates there are so-called encapsulated or surface deactivated polyisocyanates that are known to the person skilled in the art and described in EP 0 204 970, for example.

Moreover, also suitable as foamable materials are propellant-containing two-component epoxy/polyurethane compositions as described, for example, in WO 2005/080524 A1, the disclosure of which is included herewith.

Moreover, propellant-containing ethylene-vinyl acetate compositions are suitable as foamable materials.

Additional suitable foamable materials are marketed, for example, under the trade name SikaBaffle® 240, SikaBaffle® 250 or SikaBaffle® 255 by Sika Corp., USA and described in the Patents U.S. Pat. No. 5,266,133 and U.S. Pat. No. 5,373,027, the disclosure of which is included herewith. Such foamable materials are particularly preferable for the present invention.

As foamable materials with reinforcement properties it is preferable to use, for example, those marketed under the trade name SikaReinforcer® 941 by Sika Corp., USA. They are described in U.S. Pat. No. 6,387,470, the disclosure of which is included herewith.

Carrier Material

The carrier element can consist of any materials. Preferred materials are plastics, in particular polyurethanes, polyamides, polyesters and polyolefins, preferably high temperature-resistant polymers such as poly(phenylene ethers), polysulfones or polyether sulfones, which are also foamed, in particular; metals, particularly aluminum or steel; or natural organic materials, in particular wood or other (pressed) fiber materials, or glassy or ceramic materials; especially also foamed materials of this type; or any combinations of these materials. It is particularly preferable to use polyamide, in particular polyamide 6, polyamide 6.6, polyamide 11, polyamide 12 or a mixture thereof.

Moreover, the carrier element can have any desired constitution and any desired structure. For example, it can be solid, hollow or foamed, or it can have a matrix-like structure. The surface of the carrier element can typically be smooth, rough or structured.

In the case of waterproofing and reinforcing elements according to the invention, in which the foamable material is on a carrier element, the production method differs accordingly depending on whether the carrier element consists or does not consist of a material that can be processed by injection molding. In the affirmative case, a two-component injection molding method is usually used. Here, first a first component, in this case the carrier element, is injection molded. After the solidification of this first component, the cavity in the tool is enlarged or adjusted, or the blank produced is placed in a new tool, and a second component, in this case the foamable material, is molded to the first component using a second injection molding unit.

If the carrier element consists of a material which cannot be produced by the injection molding process, that is to say, for example, a metal, the carrier element is placed in an appropriate tool, and the foamable material is sprayed onto the carrier element. Naturally, the possibility also exists of attaching the foamable material by special attachment means or methods to the carrier element.

Naturally, the invention is not limited to the embodiment example shown and described. The attachment elements can be designed as desired and they can also be interchanged in the figures.

LIST OF REFERENCE NUMERALS

10; 20; 30 Insulation element
10'; 20'; 30' Expanded insulation element
11; 21; 31 Carrier element
31a Carrier element marginal area
32 Free surface of 31
13; 23; 33 Expandable material
13'; 23'; 33' Expanded material
34, 35 Attachment element
36 Through-hole
37a, 37b Delimitation cavity
C Cavity
R Reflected sound waves
T Transmitted sound waves

The invention claimed is:

1. An expandable insulation element for the acoustic insulation of an opening and/or of a cavity in a vehicle or building, comprising: a carrier element and an expandable material, wherein the carrier element has a plurality of through-holes, wherein, in a non-expanded state, only one surface of the carrier element is at least partially covered with expandable material, and the expandable material at least partially fills the through-holes, wherein, in an expanded state, the expandable material is expanded onto peripheral areas of another surface of the carrier element opposite from the surface of the carrier element which is at least partially covered with expandable material, wherein 50% to 95% of the other surface is covered with expanded material.

2. The expandable insulation element according to claim 1, wherein the expandable material extends in the through-holes substantially to the free surface of the carrier element.

3. The expandable insulation element according to claim 1, wherein the areal fraction of the through-holes amounts to 20% to 70% of the total area of the carrier element.

4. The expandable insulation element according to claim 1, wherein the through-holes have a round shape.

5. The expandable insulation element according to claim 1, wherein the carrier element has a marginal area with reduced cross section.

6. The insulation element according to claim 1, wherein the carrier element is plate-shaped.

7. The expandable insulation element according to claim 1, wherein the one surface of the carrier element is covered with a closed layer, and the other opposite surface of the carrier element is covered at least partially with expanded material in areas close to the periphery of the through-holes.

8. The expandable insulation element according to claim 1, wherein, on the completely covered surface of the carrier element, recesses are formed above the through-holes in the expanded state.

9. The use of an insulation element according to claim 1 for the acoustic insulation and/or reinforcement of an opening and/or of a cavity of a land, air or water vehicle, and/or of a cavity of a building.

10. A method for the acoustic insulation and/or reinforcement of an opening or of a cavity, wherein an insulation element according to claim 1 is introduced into the opening or the cavity, and subsequently the expandable material is expanded.

11. The expandable insulation element of claim 1, wherein 50% to 90% of the other surface is covered with expanded material.

12. The expandable insulation element of claim 1, wherein 60% to 75% of the other surface is covered with expanded material.

13. The expandable insulation element of claim 1, wherein the areal fraction of the through-holes amounts to 30% to 60% of the total area of the carrier element.

14. The expandable insulation element of claim 1, wherein the areal fraction of the through-holes amounts to 30% to 50% the total area of the carrier element.

15. The expandable insulation element of claim 1 wherein the areal fraction of the through-holes amounts to 30% to 40% the total area of the carrier element.

16. The expandable insulation element according to claim 1, wherein the through-holes have an elliptic shape.

17. The expandable insulation element according to claim 1, wherein the carrier member is an integral, planar member and the surface and the other surface of the carrier member are exterior surfaces of the carrier member.

\* \* \* \* \*